Patented May 25, 1948

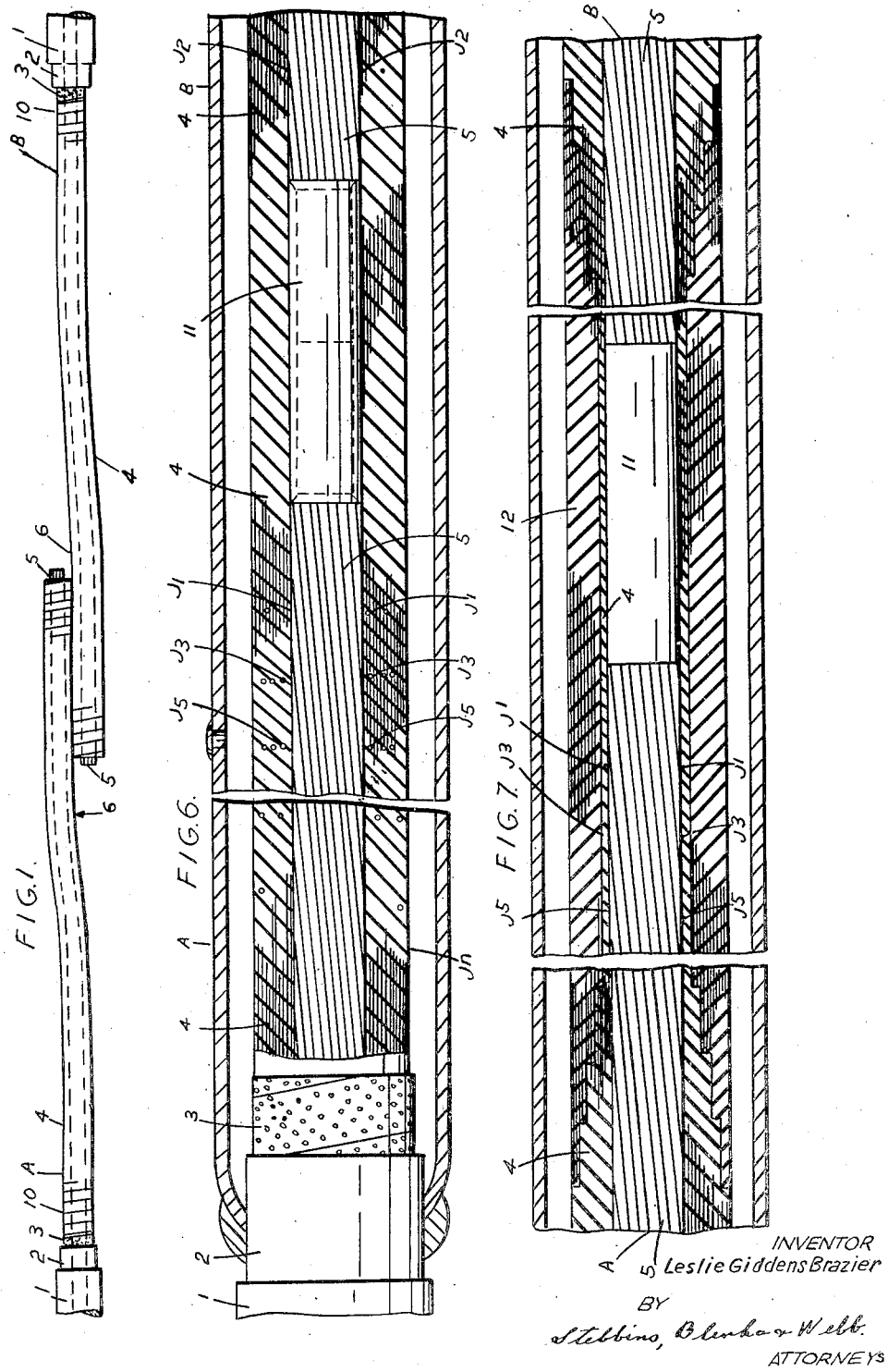

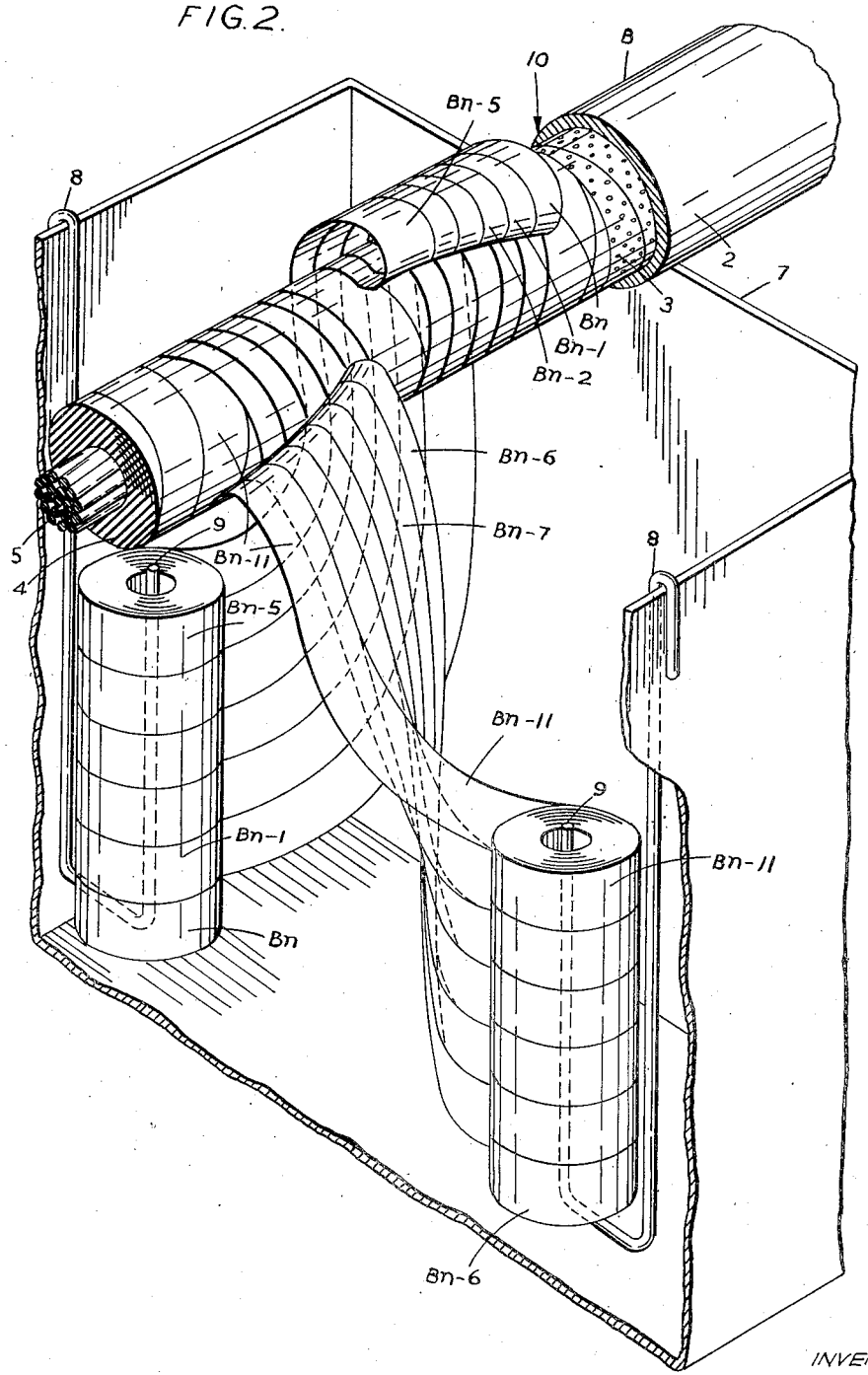

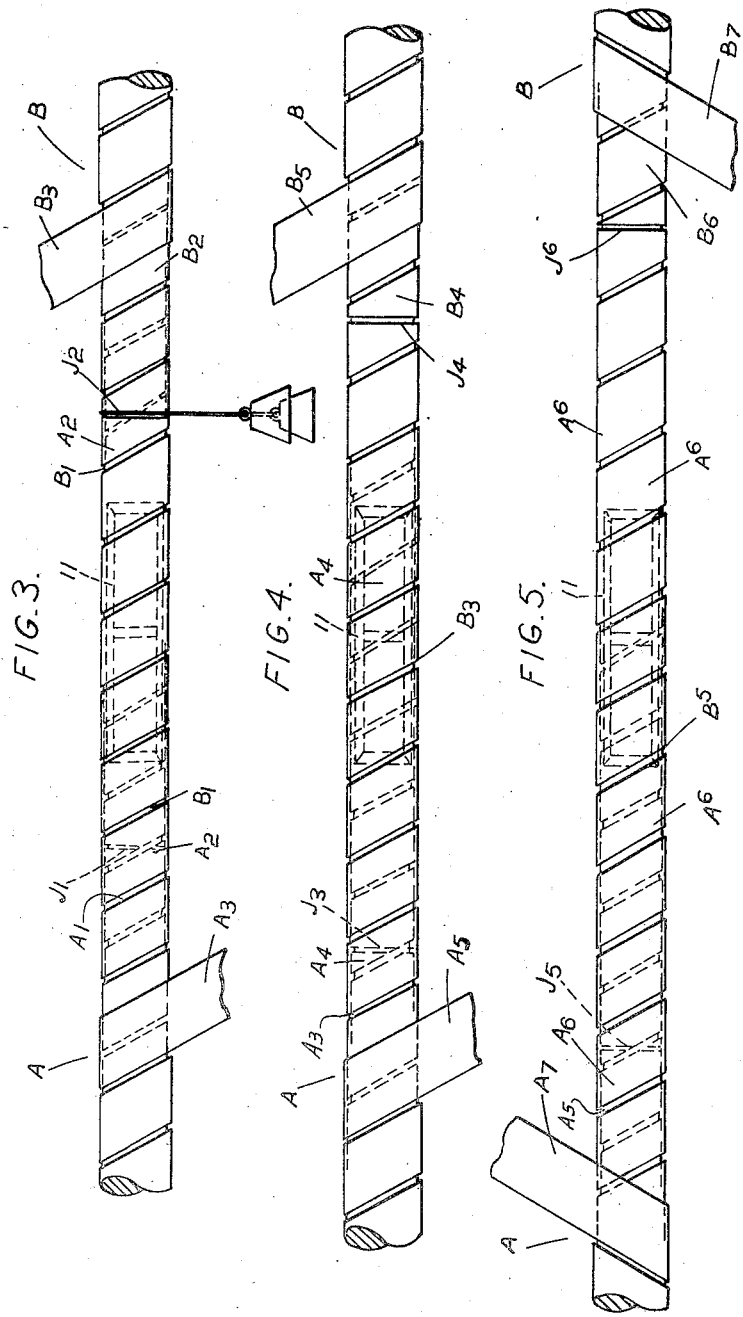

2,442,193

UNITED STATES PATENT OFFICE 2,442,193

JOINT FOR ELECTRIC CABLES

Leslie Giddens Brazier, London, England, assignor to British Insulated Callender's Cables Limited, London, England, a British company Application October 29, 1945, Serial No. 625,285
In Great Britain November 11, 1944

4 Claims. (Cl. 174—84)

This invention deals with electric cables of the kind in which the dielectric consists of helically lapped strips, for instance of impregnated paper, and particularly with such cables as are used for high working voltages. The invention provides an improved form of joint between two lengths of such cable which gives an improved dielectric construction over the joint between the conductor ends.

In the making of joints for this type of cable it is necessary to remove the dielectric from those parts of the conductor which are to be joined together and it is the practice to remove also the dielectric from a substantial length of the adjacent part of each of the cable ends, this being done in such a way as to leave a tapering body of dielectric extending from near each end of the conductor joint to a considerable distance therefrom, the thickness of dielectric increasing smoothly or in small steps, in this region from nothing up to the full thickness present in the cable. The space over the conductor joint and between these two tapering ends is then filled by building up laminated material, generally by lapping on tape or strip or sheet material by hand. This method presents the weakness that it is difficult to make an effective connection between the dielectric of the cable ends and the added material at the tapering surfaces and it is, accordingly, possible that the added material and the cable dielectric may separate at these surfaces to a greater or less extent as the result of movements produced by temperature changes or other action occurring in the working life of the cable. Such separation is naturally more dangerous in the most highly stressed region, that is, in the region of the conductor.

In accordance with the present invention I provide a form of joint for such cables which avoids or reduces the disadvantages referred to. In my improved joint the dielectric over the conductor joint is built up wholly or in part of strips, each of which is integral with and a continuation of a strip forming part of the dielectric surrounding one or other of the conductor lengths. In making such a joint I prefer to interleave the strips from one length, designated length A for convenience of description, with the strips from the other length, designated length B, layer by layer, making butt joints between the A strips and the B strips in each layer and disposing these butt joints at different points in the length of the cable joint so that the butt joints in directly adjacent layers neither register with each other nor are placed close together.

My improved method of making a cable joint will now be more fully described with reference to the accompanying drawings, wherein:

Figure 1 shows the overlapping ends of two lengths of single core impregnated paper insulated cable before removal of the paper dielectric therefrom, Figure 2 is a fragmental perspective view on an enlarged scale as compared with Figure 1, showing the first twelve strips unwrapped from the end of one length and stored ready for re-application, Figure 3 is a fragmental view of the two lengths shown in Figure 1 after the conductor joint has been made and the two innermost strips have been replaced, Figure 4 is a fragmental view of the jointed cores after the replacement of the next two strips has been effected, Figure 5 is a fragmental view of the jointed cores after the replacement of a further two strips has been effected, Figure 6 is a diagrammatic section of the complete joint showing how the butt joints between the insulating strips may be isolated from one another, Figure 7 is a diagrammatic section of a modified form of joint in which the inner layers of the dielectric are built up of the original cable strips and the outer are built up of fresh strip material.

In working in accordance with the method, the cable lengths A and B are not at first cut off so that the conductors have the final lengths required for making the joints but instead the ends are cut so that they have a substantial overlap. The outer covering 1, impervious sheath 2 and conductive screen 3 are then cut back from each length to expose a considerable length of dielectric 4, as shown in Figure 1. A short length of dielectric may also be cut back from the conductor 5 with the object of removing papers that may have become contaminated in the process of sawing off surplus cable. The paper tapes of one length, say B, are then unwrapped one by one for distances which will permit the innermost tape to be unwrapped for a distance equal to or preferably somewhat more than the total overlap of the two ends A and B, say to the point 6. Each strip as it is unwrapped is secured in a frame or other convenient arrangement and immersed in hot cable compound. In this way it is held away from the cable end to permit access to the next underlying layer of tape and is kept ready and convenient for use when required later.

Figure 2 shows a convenient way of securing the unwrapped tapes. Underneath the cable ends is a tank 7 along the sides of which are a number of detachable hooks 8 which depend in the tank and have each an upturned end 9 which serves as a spindle to support a number of the coils into which the tapes are wound as they are unwrapped from the cable end. The tank 7 will be filled to an appropriate level with cable impregnating compound but for obvious reasons the compound is not indicated in Figure 2. It will be appreciated that the number of coil supports required will be dependent upon the number of tapes used to build up the cable dielectric of which there may be as many as one or two hundred. In the example shown, it has been assumed that there are "$n$" tapes applied in groups of six, the tapes of one group being of opposite hand to those of the next and each tape being applied with a 50% overlay, as shown in Figures 3, 4 and 5. Figure 2 shows the way in which the first twelve tapes to be unwrapped are coiled and supported. These tapes have been designated $Bn$, $Bn-1$ ... $Bn-11$, since the tape next the cable conductor is designated $B_1$, the next tape $B_2$ and so on in Figures 3, 4 and 5. The distance between the point 6 to which the innermost tape is required to be unwrapped and the point 10 to which the outermost tape $n$ must be unwrapped to permit this will, as will be apparent from Figures 1 and 2, depend upon the number of tapes, their width and the amount of overlay. In the case of the cable illustrated, it will be somewhat less than one half the number of tapes on the core multiplied by their width. The temporary container tank 7 will extend from a point beyond the cut back coverings of one length to a corresponding point on the other length. The same unwrapping procedure is then carried out for the end of length A. After this the conductors are cut so that they butt together in the middle of the uncovered region and are joined in known manner, preferably by the use of a flush ferrule 11, that is, a ferrule having the same external cross-section as the general cross-section of the stranded conductors 5. After this has been completed and the surface of the ferrule has been given a satisfactorily smooth finish, the dielectric is built up on the jointed conductors.

The building up of the dielectric is done by a procedure in which the original machine-made type of structure is restored, layer by layer, by replacing the papers tapes $A_1$, $B_1$; $A_2$, $B_2$; and so on, so that in each layer of the built-up dielectric, a part of the layer is formed by a tape from length A and a part by a tape from length B. In adjacent layers the proportions between the used lengths of tape from A, and that of tape from B are varied to an extent to prevent the butt joints between the tapes from being located close together. The procedure is illustrated clearly in Figures 3, 4 and 5 of the drawings. As Figure 3 shows, the innermost tape $B_1$ from end B, is re-wrapped over the conductor for about the full length of the uncovered portion. This tape and the tape $A_1$ from the length A are cut off at appropriate points to make a butt joint $J_1$ at the meeting of their helical paths. This re-wrapping is carried out so as to give a smooth layer of the strip over the jointed conductor. After re-wrapping tape $B_1$ to a point a little beyond the point where the butt joint with tape $A_1$ is to be located, a length of piano wire weighted at each end is placed over the re-wrapped tape $B_1$ at the point where the butt joint is required and the tape $B_1$ is torn along the arc of wire engaging it. The wire is then removed and the tape $A_1$ is re-wrapped beyond the tearing point of tape $B_1$ and the weighted piano wire is placed over the re-wrapped tape $A_1$ in alignment with the torn edge of tape $B_1$, which can be observed through the tape $A_1$. Tape $A_1$ is then torn along the arc of wire engaging it and the wire is removed. The second layer is then applied by taking the tape $A_2$ from length A and re-wrapping it helically over the first strip to a point beyond the ferrule and tearing it and re-wrapping the corresponding tape $B_2$ from length B and tearing it, in the way described, to make a butt joint $J_2$ where they meet. In this way the two butt joints between the strips in the first and second layers respectively are separated by a length which is approximately the full length of the bared conductors. The tapes $A_3$ and $B_3$ are then applied and butt jointed at $J_3$, then the tapes $A_4$ and $B_4$ are applied and butt jointed at $J_4$ as shown in Figure 4. Thereupon tapes $A_5$ and $B_5$, and $A_6$ and $B_6$ are applied and butt jointed at $J_5$ and $J_6$, respectively, as shown in Figure 5. Consideration of these three figures will show that the butt joints $J_3$, $J_4$, $J_5$ and $J_6$ are spaced apart longitudinally from one another and from butt joints $J_1$ and $J_2$. This precise form of staggering of butt joints need not be followed exactly. The essential is that the butt joints should not register or come close together and this requirement can be met by proceedings within a large range of variation. An example is diagrammatically indicated in Figure 6, where the dots represent joints.

It will be appreciated that the extent to which any two butt joints may be longitudinally staggered is limited by the initial overlap of the cable ends and that by increasing this overlap the butt joints can be isolated to a much greater extent without baring the conductor of each length beyond the point 6. This is possible because the length of tape to be re-wrapped increases step by step with each layer, as will be appreciated from Figure 2.

It will be understood that the machine applied dielectric of the two cable lengths to be jointed should be similar so that the tape of any layer of one length is of the same hand and length of lay as the tape of the corresponding layer of the other length. This will generally be the case. It is not essential but facilitates the making of the butt joints.

The dielectric may be built up to the original size in the way described after which additional dielectric may be applied over the joint if required. This may be done either by helically lapping on strips or by a convolute wrapping of sheet material or by the use of a tube or any other known manner that is suitable. Finally the surface of the dielectric is made conductive, as by a wrapping of foil, so that the conductive screens of the jointed lengths are made electrically continuous and the whole enclosed in an impervious sleeve making joint with the impervious coverings of the cable lengths, as shown in Figure 6. Alternatively, as shown for example in Figure 7, only the most highly stressed layers of the dielectric may be built up of the original cable strips in the way described, the balance of the dielectric being built up by lapping on fresh tape or strip or sheet material 12 over the butt jointed layers. When this alternative method is to be followed the outer part of the dielectric from each cable end will be completely removed so as to leave a smoothly tapering or stepped body of dielectric and the tapes forming the inner part of the dielectric will be un-wrapped and stored ready for re-wrapping, as above described. This alternative procedure has the advantage that the benefits of our new method of jointing are obtained in the region where they are of most value whilst the overall length of the complete joint is very considerably reduced.

Whilst the preceding description with reference to the drawings is of a joint for an impregnated paper insulated cable, it will be understood that the procedure is applicable to cables insulated with taped dielectric of other kinds, for instance, to cables with dielectric built up of tapes of thermoplastic material—in this case the butt joints may be welded, if desired as by subjecting the abutting ends of the tapes to the influence of a local high frequency electric field.

The method of making a joint is applicable, both to single core and to multi-core cables, all conductors being treated in a similar manner.

What I claim as my invention is:

1. A method of making a joint between two lengths of electric cable of the kind comprising at least one conductor having a dielectric consisting of helically lapped strips, which comprises jointing the end of a conductor of one length to the end of a conductor of the other length and building up layer by layer on the jointed ends a laminated body of dielectric from strips unwrapped from the two lengths of cable, each layer being formed by helically wrapping over the jointed ends a strip from one length and a strip from the other length and making a butt joint between them, the butt joints being disposed in the layers so that in successive layers they neither register with each other nor lie close together.

2. A method of making a joint between two lengths of electric cable of the kind comprising at least one conductor having a dielectric consisting of helically lapped strips, which comprises unwrapping and storing at least some of the strips from the end of a conductor of each length of cable, shortening at least one of the unwrapped conductors and thereafter jointing it to the end of the unwrapped conductor of the other length, and building up layer by layer on the jointed ends a laminated body of dielectric from the stored strips by forming each layer of said laminated body by helically wrapping over the jointed ends a strip from one length and a strip from the other length and making between them a butt joint which is so located that it neither registers with nor lies close to the butt joint of the underlying layer next to it.

3. In a joint between two lengths of electric cable of the kind comprising at least one conductor and conductor dielectric therefor built up of helically lapped strips, means for jointing the end of the conductor of one cable length to the end of the conductor of the other cable length and a laminated body of dielectric surrounding the jointed ends of the conductors and comprising a number of layers, each layer consisting in part of strip integral with and a continuation of a strip forming part of the conductor dielectric of one cable length and in part of strip integral with and a continuation of a strip forming part of the conductor dielectric of the other cable length, the ends of the strips forming each layer except the first layer being longitudinally spaced from the ends of the strips forming the underlying layer.

4. An electric cable joint between two lengths of cable having a dielectric built up of helically lapped strips, said joint comprising a jointed conductor and laminated dielectric surrounding the jointed conductor, each layer of said laminated dielectric being formed in part by a helically lapped strip which is integral with and a continuation of a strip forming part of the conductor dielectric of one cable length and of which the end abuts the adjacent end of a second helically lapped strip which forms the remaining part of the layer and is integral with and a continuation of a strip forming part of the conductor dielectric of the other cable length, the abutting ends of the strips of one layer being so disposed that they neither register with nor lie close to those of the succeeding layer.

LESLIE GIDDENS BRAZIER.

REFERENCES CITED

The following references are of record in the file of this patent:

UNITED STATES PATENTS

| Number | Name | Date |
|---|---|---|
| 1,544,831 | Glowacki | July 7, 1925 |
| 2,008,756 | Green | July 23, 1935 |
| 2,105,567 | Webb | Jan. 18, 1938 |
| 2,136,258 | Vrooman | Nov. 8, 1938 |